(12) United States Patent
Glass (10) Patent No.: US 11,712,673 B2
(45) Date of Patent: Aug. 1, 2023

(54) BLENDING APPARATUS WITH AN INTEGRATED ENERGY SOURCE AND RELATED METHODS

(71) Applicant: Supreme Electrical Services, Inc., Houston, TX (US)

(72) Inventor: Cory Glass, Houston, TX (US)

(*) Notice: Subject to any disclaimer, the term of this patent is extended or adjusted under 35 U.S.C. 154(b) by 52 days.

(21) Appl. No.: 17/668,419

(22) Filed: Feb. 10, 2022

(65) Prior Publication Data

US 2022/0288547 A1 Sep. 15, 2022

Related U.S. Application Data

(62) Division of application No. 16/153,679, filed on Oct. 5, 2018, now abandoned.

(51) Int. Cl.
*B01F 35/32* (2022.01)
*B01F 33/80* (2022.01)
(Continued)

(52) U.S. Cl.
CPC .......... *B01F 35/3204* (2022.01); *B01F 33/80* (2022.01); *B01F 35/2209* (2022.01);
(Continued)

(58) Field of Classification Search
CPC .. E04G 21/04; B28C 7/00; B28C 7/02; B28C 5/0875; B28C 9/04; B28C 7/0454; B28C 7/044; B28C 9/0454; B28C 7/0418; B28C 7/0422; B28C 7/0477; B28C 7/10; B28C 9/0481; B28C 9/049; B01F 15/0235; B01F 15/00538; B01F 2215/0081; B01F 15/00519; B01F 35/71731; B01F 35/32025; B01F 35/3204; B01F 2101/49;
(Continued)

(56) References Cited

U.S. PATENT DOCUMENTS 10,221,856 B2 * 3/2019 Hernandez .............. F04B 49/20
10,815,978 B2 * 10/2020 Glass ...................... F04B 15/02
(Continued)

FOREIGN PATENT DOCUMENTS

WO  WO-2020214934 A1 * 10/2020  ......... E21B 43/2607

*Primary Examiner* — Charles Cooley
(74) *Attorney, Agent, or Firm* — Jeffrey Streets; Madan Law PLLC (57) ABSTRACT

Blending apparatuses and related methods and computer program products are disclosed. In an aspect, blending apparatuses and related methods and computer program products of the present disclosure may include at least one energy source associated with the blending apparatuses such that at least one energy source may be used to provide at least one portion of the energy required for a given blending apparatus to function, thereby reducing or eliminating need for a separate energy source to power the blending apparatus, which reduces the overall spatial footprint required by the blending apparatus and other device(s) associated therewith. Energy generated by the at least one energy source may also be used to power one or more additional devices. Blending apparatuses of the present disclosure may additionally comprise at least one control station that allows one or more users to monitor, adjust, control, interact with the blending apparatuses, thereby increasing efficiency.

15 Claims, 9 Drawing Sheets

(51) Int. Cl.
*B01F 35/22* (2022.01)
*H02K 7/14* (2006.01)
*B01F 35/75* (2022.01)

(52) U.S. Cl.
CPC .. *B01F 35/32025* (2022.01); *B01F 35/32055* (2022.01); *B01F 35/32065* (2022.01); *B01F 35/7544* (2022.01); *H02K 7/14* (2013.01)

(58) Field of Classification Search
CPC .............. B01F 33/805; B01F 35/71775; B01F 33/823; B01F 33/80; B01F 35/2209; B01F 35/32055; B01F 35/32065; B01F 33/5021; F01D 15/08; F01D 15/10; F02C 3/22; F04B 49/20; F04B 19/22; F04B 17/03; F04B 17/06; F04B 23/00; F04B 47/02; F04B 49/065; H02P 23/00; E21B 43/267; E21B 43/26; E21B 43/2607; E21B 21/06; E21B 21/08; E21B 21/062; B65G 33/18; B65G 47/19; Y02P 70/10; H02K 7/14; H02K 7/16

USPC .... 366/14–20, 27–29, 33–35, 64–66, 37–38, 366/31–32, 50–51, 41, 155.1–158.4
See application file for complete search history.

(56) References Cited

U.S. PATENT DOCUMENTS

| | | | |
|---|---|---|---|
| 10,865,631 B1* | 12/2020 | Zhang | F04B 17/03 |
| 11,554,948 B2* | 1/2023 | Cady | B67D 7/0401 |
| 2014/0138079 A1* | 5/2014 | Broussard | H02P 23/00 166/66.4 |
| 2015/0252661 A1* | 9/2015 | Glass | E21B 43/2607 166/308.1 |
| 2019/0154020 A1* | 5/2019 | Glass | F04B 15/02 |
| 2020/0108364 A1* | 4/2020 | Glass | B01F 35/32025 |
| 2021/0198994 A1* | 7/2021 | Christinzio | B01F 35/71775 |
| 2022/0161212 A1* | 5/2022 | Wilson | B01F 35/32045 |

* cited by examiner

BLENDING APPARATUS WITH AN INTEGRATED ENERGY SOURCE AND RELATED METHODS

CROSS-REFERENCE TO RELATED APPLICATIONS

This application is a divisional application of U.S. patent application Ser. No. 16/153,679 filed on Oct. 5, 2018.

FIELD OF THE DISCLOSURE

The present disclosure generally relates to blending apparatuses and related methods and computer program products and more particularly to blending apparatuses and related methods and computer program products that comprise at least one energy source integrated with such blending apparatuses and configured to supply at least one amount of energy thereto.

BACKGROUND

The statements in this section merely provide background information related to the present disclosure and may not constitute prior art.

Many types of oilfield operations currently exist that facilitate the extraction of hydrocarbons and natural gas from underground formations. One such oilfield operation is known as hydraulic fracturing. Hydraulic fracturing typically involves pumping fluid(s) down a wellbore at pressures and/or flow rates that are capable of fracturing subterranean formations, thereby inducing the flow of hydrocarbons from those formations.

Generally, hydraulic fracturing is used for unconventional subterranean formations, where the significantly low permeability of the formations causes hydrocarbons to become "trapped" in the rocks, thereby preventing them from flowing freely into a wellbore. Common hydraulic fracturing techniques involve utilizing at least one delivery system to pump one or more fluids down a wellbore at a pressure and/or flow rate that is greater than the fracture gradient of the particular formation that contains the wellbore. Such fluid(s) may comprise one or more additives referred to as "proppant." Proppant often comprises a sand-like texture due to its particulate properties. The pumping process creates fractures in the rocks of the formation that may be filled by the proppant so that the fractures are not immediately closed again due to the immense subterranean geological pressures they experience. The proppant also provides a highly permeable conduit within the fractures that allows the newly released hydrocarbons to easily flow to the wellbore where they can be recovered.

The process of hydraulic fracturing typically requires at least one fluid delivery system that includes a variety of different components. For example, several trucks and/or trailers are needed to carry fresh water, one or more chemicals or other fluids, proppant or other additives, at least one manifold (also known as a "missile"), and at least one pumping mechanism. The water is mixed with the chemical(s), fluid(s), proppant, and/or other additives in at least one device known as a blender, thereby forming a mixture typically referred to as "slurry." This slurry then gets pumped to the manifold, which typically comprises a high-pressure side and a low-pressure side. Slurry is received by the manifold at one or more inlets on the low-pressure side. The slurry is then redirected to at least one pressurizing pumping mechanism, or "frac pump," configured on a separate truck/trailer adjacent to the manifold. The frac pump significantly increases the pressure of the slurry and then directs it to the high-pressure side of the manifold. The manifold may then distribute the high-pressure slurry to the opening of a wellbore so that it may be used to propagate one or more fractures downhole.

In order to form the slurry mixture, the blender(s) require a substantial amount of energy. This energy is typically supplied by multiple hydraulic motors powered by multiple diesel engines. These diesel engines take up a substantial amount of space at a well site and require a considerable amount of time and resources to be spent on retrieving fresh supplies of diesel fuel. Additionally, currently available blenders are less efficient to operate than they could be in that they are controlled remotely, typically by a control center set up in one or more data vans. This may cause delays in making adjustments to the blender(s) in that problems or issues that are observed with the blender(s) must be communicated to one or more individuals in the data van(s) before they are resolved; or, an observer of the blender issue(s) must walk to a data van in order to make the required adjustments or to view more detailed information regarding the problem(s).

Given the foregoing, blending apparatuses and related methods and computer program products are needed that allow less space to be occupied at a location where blending activities are required. Blending apparatuses and related methods and computer program products that include a more efficient means of being adjusted, controlled, and/or monitored are also desired.

SUMMARY

This Summary is provided to introduce a selection of concepts. These concepts are further described below in the Detailed Description section. This summary is not intended to identify key features or essential features of this disclosure's subject matter, nor is this Summary intended as an aid in determining the scope of the disclosed subject matter.

Aspects of the present disclosure meet the above-identified needs by providing blending apparatuses and related methods and computer program products that include at least one energy source associated with the blending apparatuses. Specifically, in an aspect, blending apparatuses and related methods and computer program products are disclosed that comprise at least one energy source located proximal to or affixed to at least one portion of a given blending apparatus. The at least one energy source may provide energy that may at least partially facilitate the functioning of the blending apparatus itself, as well as one or more additional elements, machines, systems, or devices that may be associated with one or more activities or operations related to the functioning of the blending apparatus, such as, for example, one or more well site operations, as well as various other elements, machines, systems, or devices. This may reduce or eliminate the need for separate diesel engines at the well site, thereby saving space, time, and/or money in not having to purchase and/or obtain as much (or any) diesel fuel or make room to accommodate any separate diesel engines.

In some aspects, the at least one energy source may comprise one or more turbine generators. The turbine generator(s) may be powered by any appropriate fuel type, including natural gas (including compressed natural gas), diesel fuel, condensate, and the like, as well as any combination thereof, and may function to generate at least one amount of electrical energy.

In some aspects, the blending apparatuses of the present disclosure may further comprise at least one control station located proximal to a given blending apparatus or affixed to at least one portion thereof. The control station may comprise at least one computing device and may be used to control, adjust, and/or monitor the functioning of the blending apparatus itself and/or one or more elements machines, systems, or devices associated with the operation of the blending apparatus, including various elements, machines, systems, or devices associated with various well site operations.

Further features and advantages of the present disclosure, as well as the structure and operation of various aspects of the present disclosure, are described in detail below with reference to the accompanying drawings.

BRIEF DESCRIPTION OF THE DRAWINGS

The features and advantages of the present disclosure will become more apparent from the Detailed Description set forth below when taken in conjunction with the drawings in which like reference numbers indicate identical or functionally similar elements.

DETAILED DESCRIPTION

The present disclosure is directed to blending apparatuses and related methods and computer program products that include at least one energy source associated with the blending apparatuses. Specifically, in an aspect, blending apparatuses and related methods and computer program products are disclosed that comprise at least one energy source that may be configured proximal to or affixed upon or may be otherwise integrated with a given blending apparatus. The at least one energy source may be configured to provide at least one portion of the energy needed to operate the blending apparatus, thereby giving the blending apparatus an at least partially "self-powered" nature.

In some aspects, the at least one energy source associated with the blending apparatuses of the present disclosure may be configured to supply power to one or more additional elements, machines, systems, or devices associated with one or more activities or operations that may or may not be related to the functioning of a given blending apparatus, including, by way of example and not limitation, one or more well site operations.

In some aspects, the blending apparatuses of the present disclosure may further comprise at least one control station located proximal to a given blending apparatus or affixed to at least one portion thereof. The at least one control station may comprise at least one computing device. Among other things, the at least one control station may be used to control and/or monitor the functioning of the blending apparatus itself or one or more elements, machines, systems, or devices associated with the operation of the blending apparatus, including various elements, machines, systems, or devices associated with one or more well site operations.

The term "blending apparatus" and/or the plural form of this term are used throughout herein to refer to any element, machine, apparatus, or device that may be configured to function, at least partially, either by itself or in conjunction with one or more additional elements, machines, devices, or apparatuses to combine at least two substances, elements, mixtures, or compounds together to form a third substance, element, mixture, or compound, such as blenders, mixers, chemical injectors, and the like.

The term "additive" and/or the plural form of this term are used throughout herein to refer to any substance, particle, compound, mixture, or element that may be added to and mixed with one or more fluids via at least one blending apparatus as defined above, such as proppant, chemicals, acids, sodium chloride, polyacrylamide, ethylene glycol, borate salts, sodium carbonates, potassium carbonates, glutaraldehyde, guar gum, citric acid, isopropanol, friction reducers, disinfectants, gelling agents, breakers, emulsifiers, stabilizers, surfactants, potassium chloride (KCI), iron control chemicals, oxygen scavengers, scale inhibitors, pH adjusting agents, carboxymethyl hydroxypropyl guar (CMHPG) gels, corrosion inhibitors, biocides, cement, and the like.

The term "fluid" and/or the plural form of this term are used throughout herein to refer to any liquid or gaseous substance(s) that may be mixed with one or more additional fluids and/or additives as defined above via at least one blending apparatus as defined above, such as water, oil, methanol, slickwater, gasoline, one or more petroleum products, one or more chemicals, one or more gels, one or more crosslinkers, saltwater, brine, one or more acids, produced water, dirty water, liquefied natural gas (LNG), biofuel (or one or more products thereof), pipeline quality natural gas (or any quality natural gas), propane, diesel fuel, fuel oil, and the like.

The term "user" and/or the plural form of this term are used throughout herein to refer to any human or entity that may utilize the blending apparatuses of the present disclosure and the computer program products associated therewith, such as company employees, technicians, managers, machine operators, engineers, companies, third parties, corporations, other business entities, and the like.

The term "fuel" and/or the plural form of the term are used throughout herein to refer to any material, substance, force, or product that may be captured, used, and/or altered in order to generate usable energy, such as natural gas, compressed natural gas, diesel fuel, condensate, gasoline, sunlight, electricity, wind, and the like.

Figure 1:
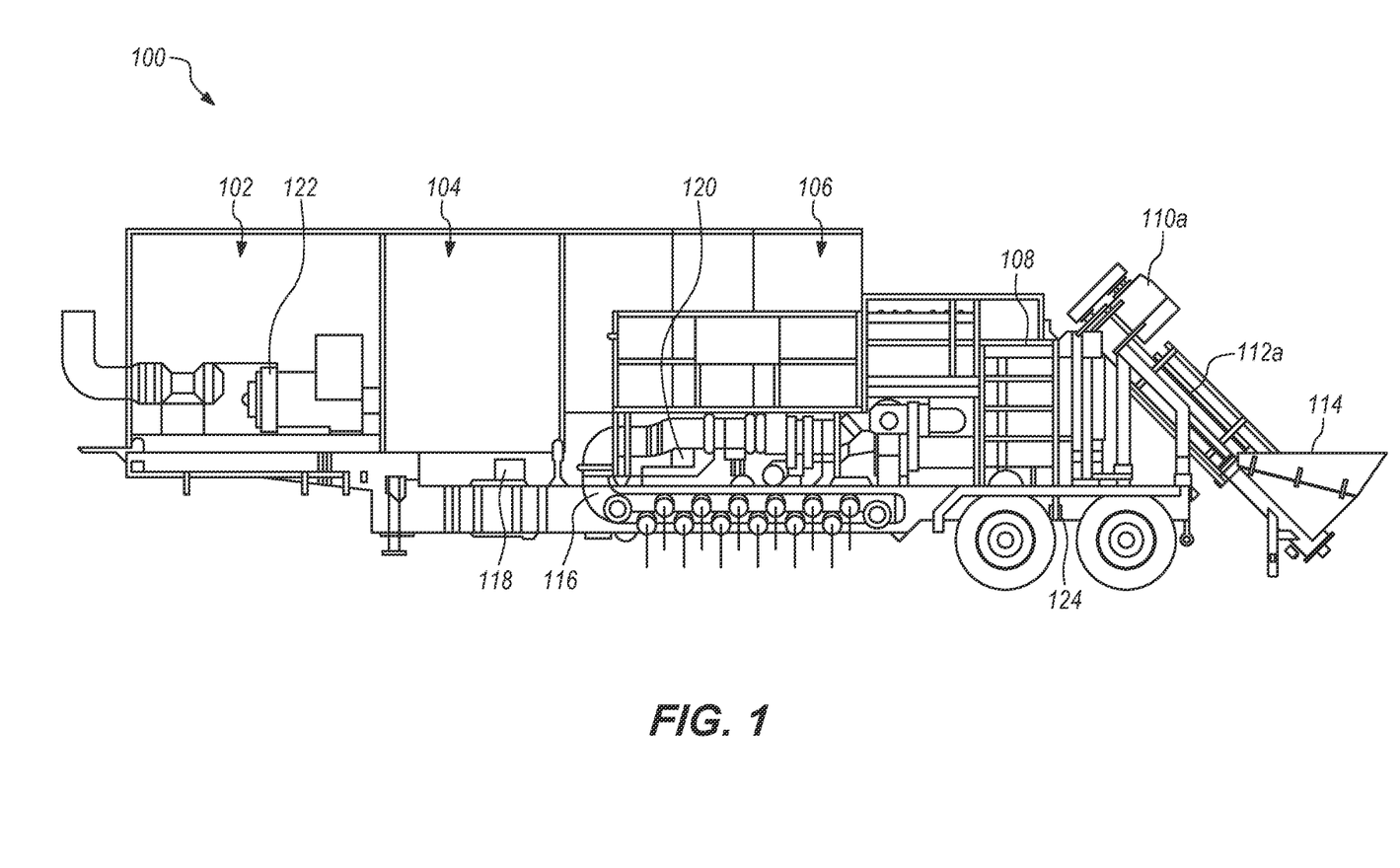
FIG. 1 is a side view of an exemplary blending apparatus comprising at least one energy source, according to an aspect of the present disclosure.
Figure 2:
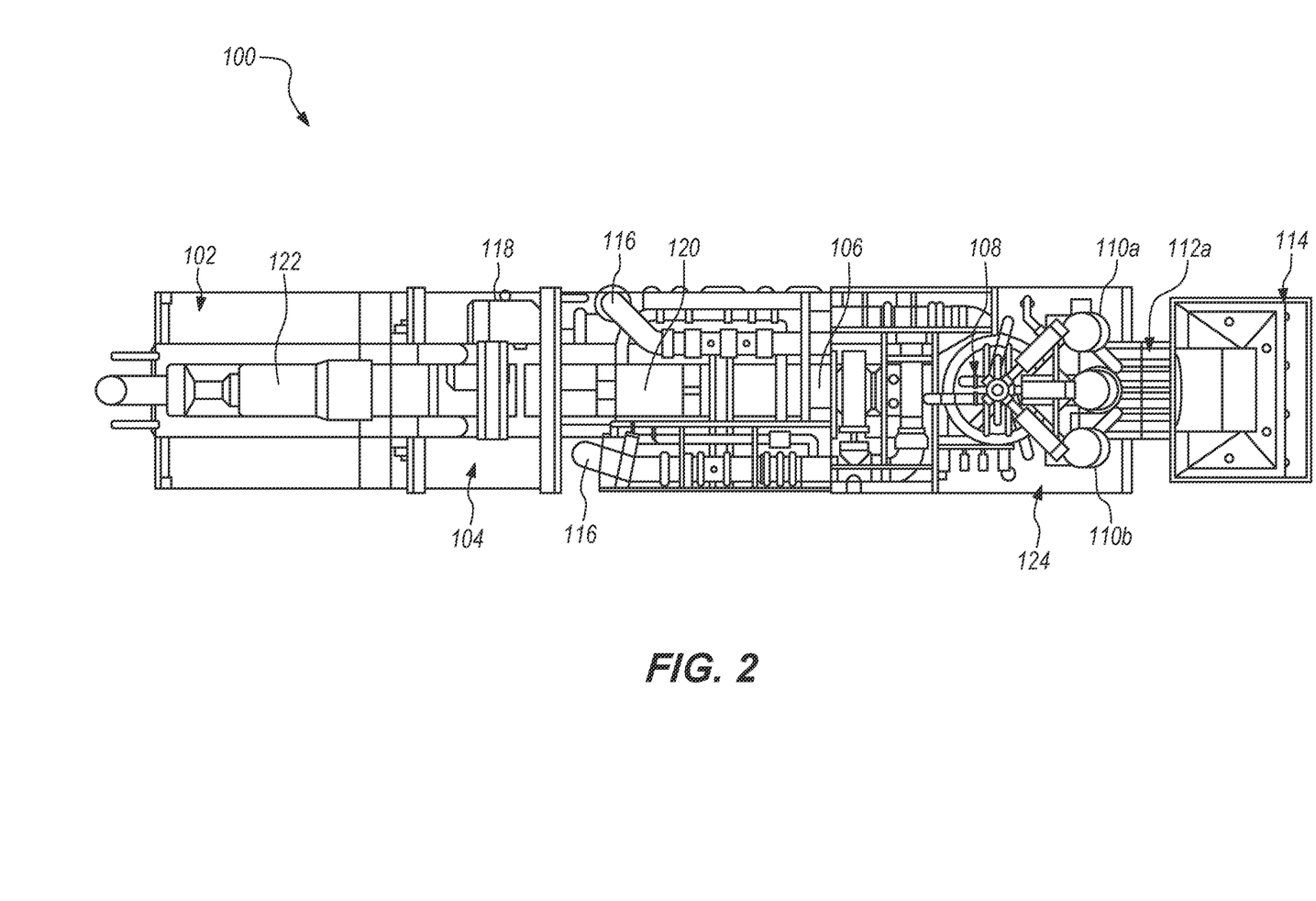
FIG. 2 is a top view of an exemplary blending apparatus comprising at least one energy source, according to an aspect of the present disclosure.

Referring now to FIG. 1, a side view of an exemplary blending apparatus 100 comprising at least one energy source 102, and also to FIG. 2, a top view of the exemplary blending apparatus 100, according to an aspect of the present disclosure, is shown.

Blending apparatus 100 may comprise at least one energy source 102 and at least one blending tub 108. Energy source(s) 102 may be configured in a location proximal to blending apparatus 100, may be affixed or attached to at least one portion of blending apparatus 100, or may be otherwise integrated with blending apparatus 100. In some aspects, energy source(s) 102 may be configured to provide enough energy to at least partially power blending apparatus 100 and/or one or more additional devices, machines, or systems that may or may not be associated with the functioning of blending apparatus 100. In some aspects wherein blending apparatus 100 may be utilized in one or more drilling applications at a well site, the at least one additional device, machine, or system may comprise any other device, machine, or system (including "backside equipment") that may be used at the well site, such as, by way of example and not limitation, at least one pumping mechanism, at least one hydration unit, at least one chemical additive unit, at least one gel tanker, at least one acid tanker, at least one piece of sand equipment (e.g., one or more components of a conveyor belt or pneumatic conveyance system for delivering proppant to blending apparatus 100), and at least one piece of water equipment (e.g., one or more portions of a tank truck or pipeline conveyance system), as well as any similar devices, machines, or systems as may be apparent to those skilled in the relevant art(s) after reading the description herein. In order to provide energy to one or more of these devices/machines/systems, the device(s)/machine(s)/system(s) may be connected to energy source(s) 102 via any appropriate means, including, by way of example and not limitation, via wiring, cables, and any similar appropriate means as may be apparent to those skilled in the relevant art(s) after reading the description herein, as well as any combination thereof.

In some aspects wherein energy source(s) 102 may be affixed/attached to at least one portion of blending apparatus 100, such affixture/attachment may be accomplished by any appropriate means, including, for example and not limitation, via welding, adhesion, and/or the use of one or more fastening elements (such as nails, nuts, bolts, screws, washers, clips, clamps, clamping systems, clasps, hooks, pins, brackets, and the like, as well as any combination thereof). Such affixture/attachment may be permanent or temporary. In some embodiments wherein blending apparatus 100 may be used in one or more drilling applications at a well site, blending apparatus 100 and energy source(s) 102 may be comprised upon a single trailer 124, single skid, single vehicle, single container, or single transportable package either securely or removably (e.g., via welding, adhesion, and/or the use of one or more fastening elements (such as nails, nuts, bolts, screws, washers, clips, clamps, clamping systems, clasps, hooks, pins, brackets, and the like, as well as any combination thereof)).

As will be appreciated by those skilled in the relevant art(s) after reading the description herein, energy source(s) 102 may comprise a variety of forms, including, by way of example and not limitation, one or more turbine generators 122, one or more switched reluctance motors (SRMs), one or more windmills, one or more solar panels, one or more batteries, and/or other power capturing and/or generation equipment as may be apparent to those skilled in the relevant art(s) after reading the description herein (including any combination thereof) that may be configured to receive, capture, and/or utilize at least one type of energy or fuel and convert it to a useable form of energy (such as, by way of example and not limitation, mechanical energy and/or electricity, including alternating current (AC) and/or direct current (DC) electricity). Types of energy or fuel that may be received and/or captured by energy source(s) 102 may include, by way of further example and not limitation, natural gas (including compressed natural gas), diesel fuel, condensate, gasoline, sunlight, electricity, wind, and/or any other appropriate types of energy or fuel as may be apparent to those skilled in the relevant art(s) after reading the description herein, as well as any combination thereof. In some nonlimiting exemplary embodiments wherein the fuel may comprise natural gas, the natural gas may be delivered from a remote location or may be drilled for and received at a site at which blending apparatus 100 may be used. In some aspects, any of the various types of energy or fuel that may be received and/or captured by energy source(s) 102 may be stored within at least one portion of blending apparatus 100 (e.g., natural gas may be stored in an appropriate container).

Blending tub(s) 108 may be configured with one or more paddles or similar mechanisms to blend/mix/combine one or more substances, elements, mixtures, or compounds to form at least one new substance/element/mixture/compound such as, by way of example and not limitation, to facilitate the blending of one or more additives with one or more fluids to form a slurry/fracturing fluid for one or more hydraulic fracturing applications. Fluid(s) may be received from one or more fluid sources, while additive(s) may be received from one or more additive sources, such, by way of example and not limitation, at least one hopper 114. In some nonlimiting exemplary embodiments, additive(s) may be taken from hopper(s) 114 to blending tub(s) 108 via at least one auger 112 (labeled only as auger 112a in FIG. 1, for clarity). Auger(s) 112 may be powered, for example and not limitation, by one or more electric auger motors 110 (labeled only as electric auger motor 110a in FIG. 1, for clarity). Fluid(s) may be delivered to and mixtures/combinations (e.g., slurry) may be taken from blending tub(s) 108 via at least one manifold apparatus 116. In some aspects, each manifold apparatus 116 may include a suction end for receiving substance(s)/element(s)/mixture(s)/compound(s) and a discharge end for releasing mixtures/combinations. In some additional aspects, the facilitation of substance/element/mixture/compound intake at the suction end may be powered by at least one suction motor 118 and the facilitation of release of mixtures/compounds at the discharge end may be powered by at least one discharge motor 120. In various aspects, one or more motors within blending tub(s) 108 as well as auger motor(s) 110, suction motor(s) 118, and/or discharge motor(s) 120 may be at least partially powered by electricity generated and/or provided by energy source(s) 102.

In some aspects wherein blending apparatus 100 may comprise a blender utilized in one or more drilling applications at a well site, blending apparatus 100 may be configured to provide a supply of adequately mixed ingredients in the form of slurry/fracturing fluid at a desired treatment rate to at least one pressure pumping mechanism for delivery to at least one wellbore. Blending apparatus 100 may comprise at least one electric motor (including electric auger motor(s) 110, one or more outlet discharge motors 120, one or more inlet suction motors 118, one or more blending tub 108 motors, and the like) that may be at least partially powered by electricity generated and/or provided by energy source(s) 102. As an illustrative example of one nonlimiting exemplary embodiment, blending apparatus 100 may function by having one or more fluids pumped into blending tub(s) 108 (such as, for example and not limitation, a centrifugal blending tub) through an inlet suction portion of manifold apparatus 116 via one or more electric inlet suction motors 118. Additionally, one or more additives may be delivered to blending tub(s) 108 from hopper(s) 114 via one or more augers 112 powered by one or more electric auger motors 110. The fluid(s) and additive(s) may then be blended/mixed/combined within blending tub(s) 108 (in some instances, after passing through at least one hydration unit) via the action of at least one electric blending motor in order to form a slurry/fracturing fluid. The slurry/fracturing fluid, in turn, may then be taken out of blending tub(s) 108 and through an outlet discharge portion of manifold apparatus 116 via at least one electric outlet discharge motor 120 and then sent on to a wellbore.

In some aspects, in order to convert power generated by energy source(s) 102 to usable electricity in appropriate forms to appropriate locations, blending apparatus 100 may further comprise at least one drive system that may be at least partially contained within at least one drive housing 104. By way of example and not limitation, the drive system may comprise one or more variable frequency drives (VFDs), as well as any other appropriate drive systems and/or components as may be apparent to those skilled in the relevant art(s) after reading the description herein (including any combination thereof).

Figure 3A:
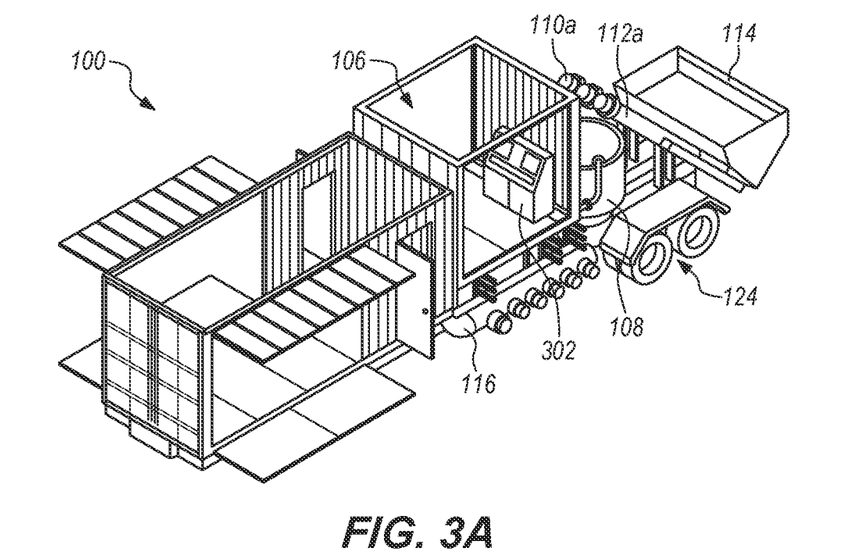
FIGS. 3A-3B are perspective views of an exemplary blending apparatus comprising at least one energy source, according to an aspect of the present disclosure.
Figure 3B:
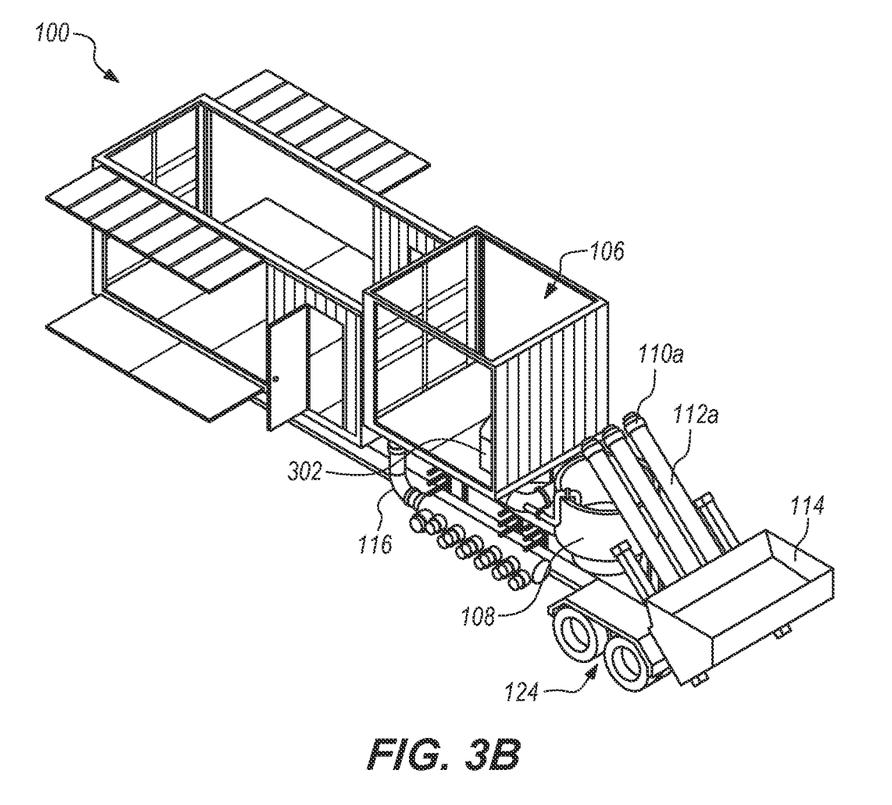
Figure 4:
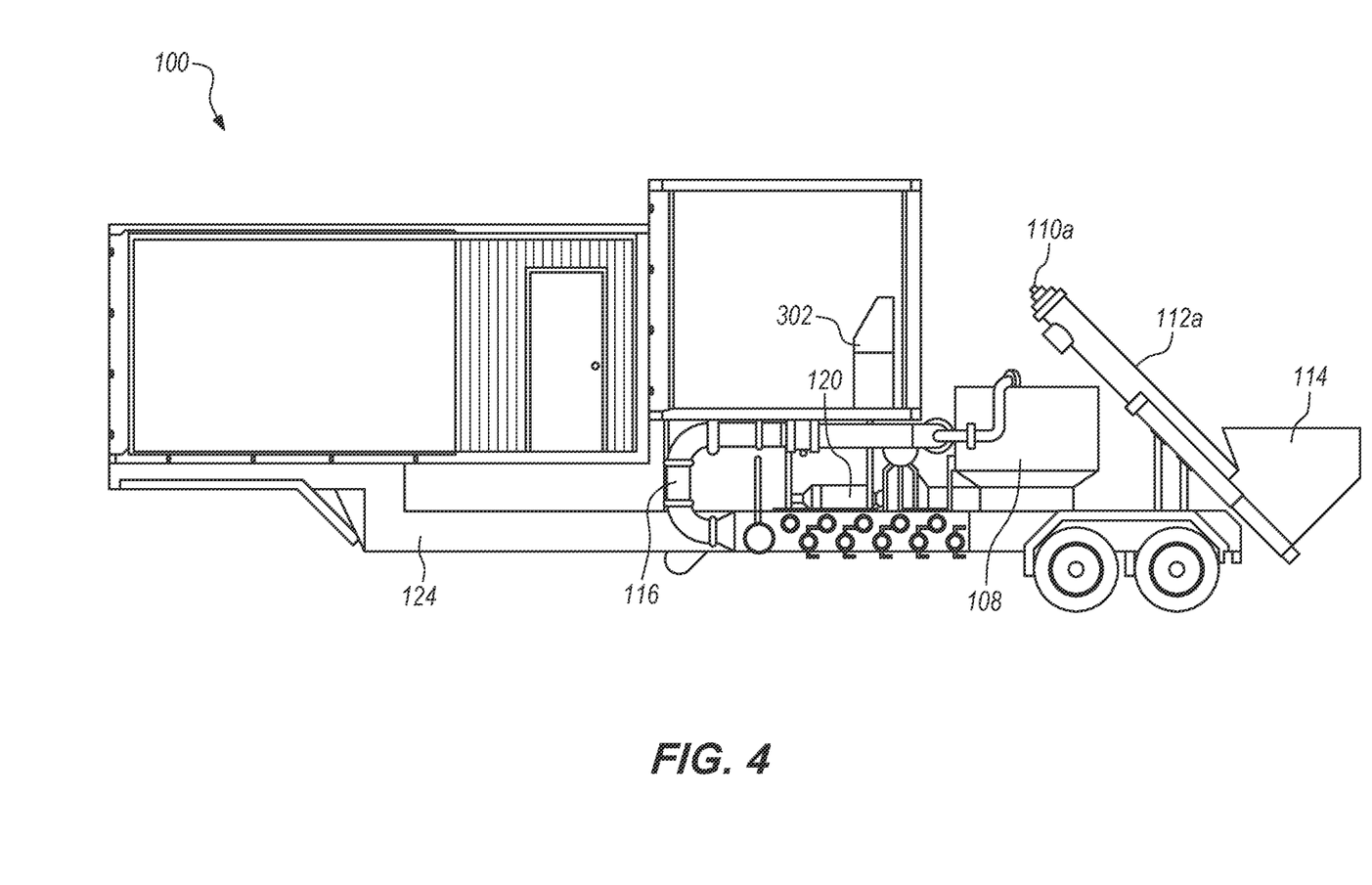
FIG. 4 is a second side view of an exemplary blending apparatus comprising at least one energy source, according to an aspect of the present disclosure.
Figure 5A:
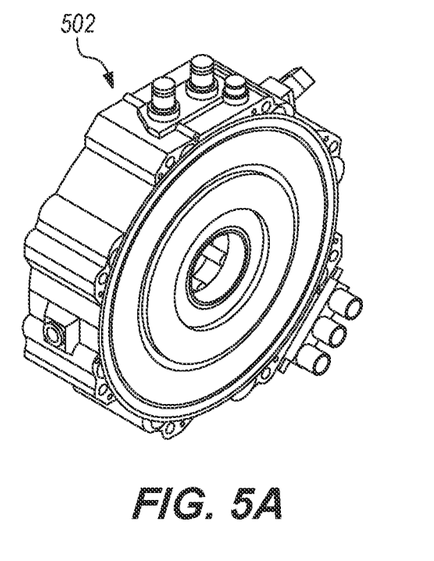
FIGS. 5A-5F are various views of an exemplary motor configured to at least partially comprise at least one energy source configured to at least partially power at least one blending apparatus, according to an aspect of the present disclosure.
Figure 5B:
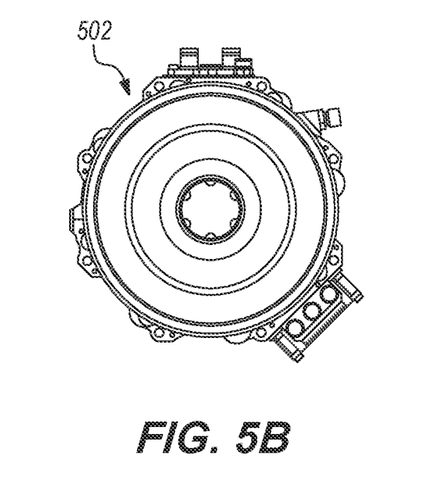
Figure 5C:
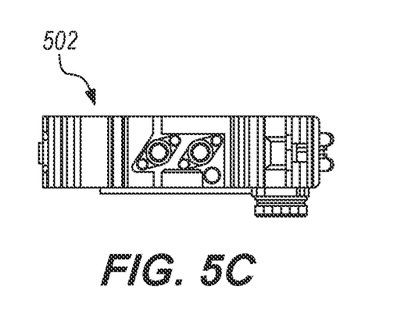
Figure 5D:
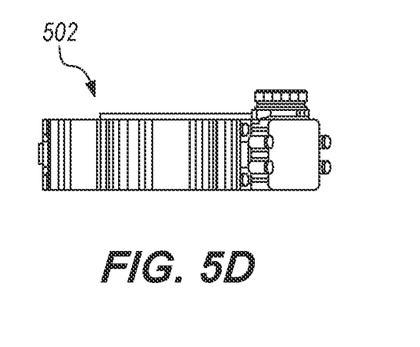
Figure 5E:
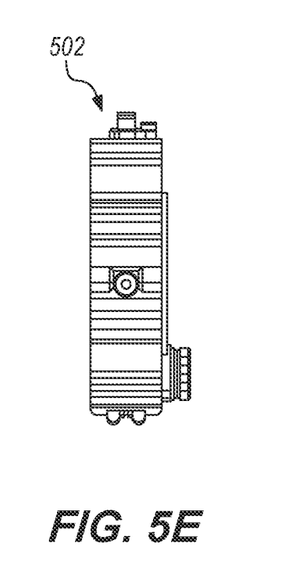
Figure 5F:
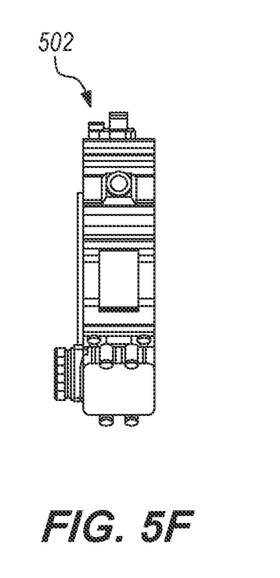

Referring now to FIGS. 3A-3B, perspective views of an exemplary blending apparatus 100 comprising at least one energy source (not shown), and also to FIG. 4, a side view of the exemplary blending apparatus 100, according to an aspect of the present disclosure, are shown.

In some aspects, blending apparatus 100 may further comprise at least one means for communicating with at least one user, such as, by way of example and not limitation, at least one control station 302. By way of example and not limitation, control station(s) 302 may comprise at least one computing device (such as, for example and not limitation, a desktop computer, a laptop computer, a tablet or mobile computer, a smartphone (alternatively referred to as a mobile device), a Personal Digital Assistant (PDA), a mobile phone, a handheld scanner, any commercially-available intelligent communications device, or the like) and/or at least one computer kiosk or any similar device that may be apparent to those skilled in the relevant art(s) after reading the description herein communicatively coupled (either wirelessly (such as, for example and not limitation, via Bluetooth® (a wireless technology standard standardized as IEEE 802.15.1)) or via hardwired connectivity) to blending apparatus 100. One or more users may communicate with a particular blending apparatus 100 via control station(s) 302 in order to detect, identify, and/or initiate the resolution of one or more issues or problems associated with one or more aspects of and/or with the operation of or functionality of blending apparatus 100, including energy source(s) 102 (not shown; see FIGS. 1-2). In some nonlimiting exemplary embodiments, control station(s) 302 may additionally be used to control, monitor, and/or adjust at least one of: a flow rate, a mixing speed, a mixing intensity, a blend quality, and a delivery rate associated with one or more substances, elements, mixtures, and/or compounds passing through and/or being mixed within blending apparatus 100, as well as controlling, monitoring, and/or adjusting any similar aspect(s) of blending apparatus 100 as may be apparent to those skilled in the relevant art(s) after reading the description herein. Additionally, in some further nonlimiting exemplary embodiments, control station(s) 302 may be used to control, monitor, and/or adjust an energy and/or fuel input, an energy (e.g., electrical) output, and/or other aspect of energy source(s) 102 (not shown; see FIGS. 1-2) of blending apparatus 100. In some additional aspects, one or more users may use one or more input devices associated with control station(s) 302 (such as, for example and not limitation, a mouse, keyboard, touchscreen, joystick, microphone, camera, scanner, chip reader, card reader, magnetic stripe reader, near field communication technology, and the like) in order to communicate with blending apparatus 100. In still some additional aspects, control station(s) 302 may comprise computational instructions, or code, in the form of software or one or more software applications that, when executed on at least one computer processor, causes the at least one computer processor to automatically control, monitor, and/or adjust one or more aspects of blending apparatus 100 and/or energy source(s) 102 (not shown; see FIGS. 1-2) to meet and/or maintain one or more preset standards and/or to automatically detect, identify, and/or initiate the resolution of one or more issues or problems associated with one or more aspects of and/or with the operation of or functionality of blending apparatus 100, including energy source(s) 102 (not shown; see FIGS. 1-2), in a substantially self-controlled at least semi-autonomous way with minimal or no need for user input or with only passive user approval.

Control station(s) 302 may be configured in a location proximal to or may be affixed/attached to at least one portion of blending apparatus 100 such as, by way of example and not limitation, by being at least partially contained within at least one portion of a control area 106. Such affixture/attachment may be permanent or temporary and may be accomplished by any appropriate means, including, for example and not limitation, via welding, adhesion, and/or the use of one or more fastening elements (such as nails, nuts, bolts, screws, washers, clips, clamps, clamping systems, clasps, hooks, pins, brackets, and the like, as well as any combination thereof). In some nonlimiting exemplary embodiments wherein blending apparatus 100 may be used in one or more drilling applications at a well site, control station(s) 302 and blending apparatus 100 (including energy source(s) 102) may be comprised upon a single trailer 124, single skid, single vehicle, single container, or single transportable package, either securely or removably (e.g., via welding, adhesion, and/or the use of one or more fastening elements (such as nails, nuts, bolts, screws, washers, clips, clamps, clamping systems, clasps, hooks, pins, brackets, and the like, as well as any combination thereof)). By providing a means for communicating with, making one or more adjustments to, and/or monitoring or otherwise controlling blending apparatus 100 (including energy source(s) 102) at the actual location at which blending apparatus 100 is functioning, a user may be able to interact with blending apparatus 100 in substantially real time without the need to communicate with an individual in a remote location or to physically go to a remote location (such as, by way of example and not limitation, a data van control center) in order to interact with blending apparatus 100.

This may improve efficiency with regard to the use of blending apparatus 100, thereby saving the user(s) both time and money. However, as will be appreciated by those skilled in the relevant art(s) after reading the description herein, control station(s) 302 may be located at one or more remote locations and may facilitate the interaction with blending apparatus 100 via one or more forms of wireless communication without departing from the spirit and scope of the present disclosure.

Referring now to FIGS. 5A-5F, various views of an exemplary motor 502 configured to at least partially comprise at least one energy source 102 configured to at least partially power at least one blending apparatus 100, according to an aspect of the present disclosure, are shown.

In some aspects, energy source 102 (not shown in FIGS. 5A-5F) may comprise at least one motor 502 in the form of a traction motor, an AC induction motor, and/or a permanent magnet AC (PMAC) motor, wherein the AC induction motor may be a 3-phase AC induction motor. In some additional aspects, by way of example and not limitation, each motor 502 may be configured to produce approximately 200 horsepower and 295 foot pounds (ft-lbs.) of torque. In some additional nonlimiting exemplary embodiments, each motor 502 may be configured as a direct current (DC) and/or an alternating current (AC) generator in order to produce up to 700 volts of DC electric potential. By way of still further example and not limitation, a given energy source 102 may be configured with four (or more or fewer) motors 502 configured as generators mounted onto the output shaft of a turbine generator 122 (not shown in FIGS. 5A-5F) (or mounted onto any other appropriate portion of turbine generator 122) and may thereby be configured to generate an amount of electricity which may be used to at least partially power one or more components of blending apparatus 100 (not shown in FIGS. 5A-5F), such as, for example and not limitation, one or more additional motors 502 used to drive one or more pumping mechanisms.

Figure 6A:
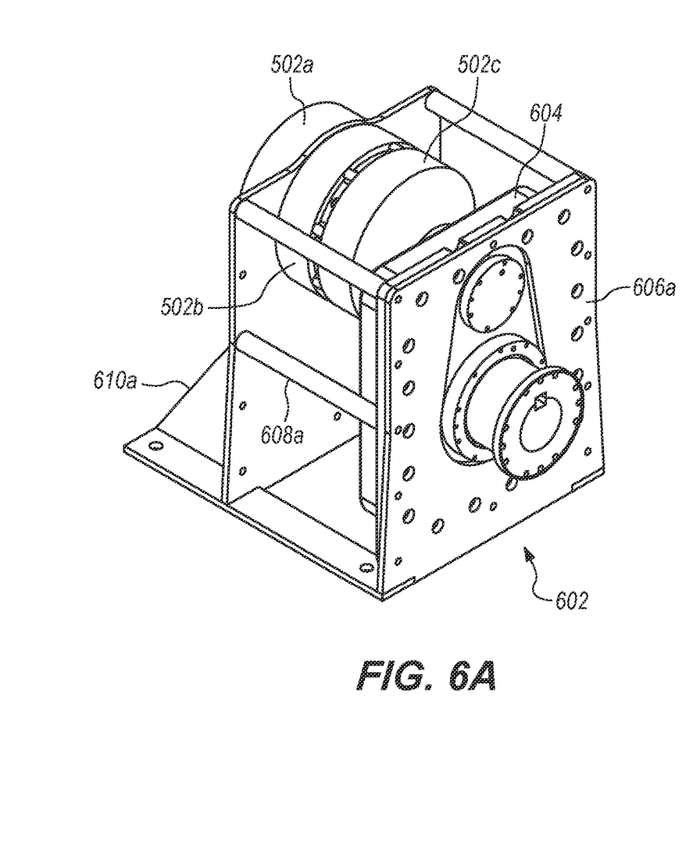
FIGS. 6A-6C are various views of an assembly configured to at least partially power at least one discharge pump that may be associated with at least one blending apparatus that comprises at least one energy source, according to an aspect of the present disclosure.
Figure 6B:
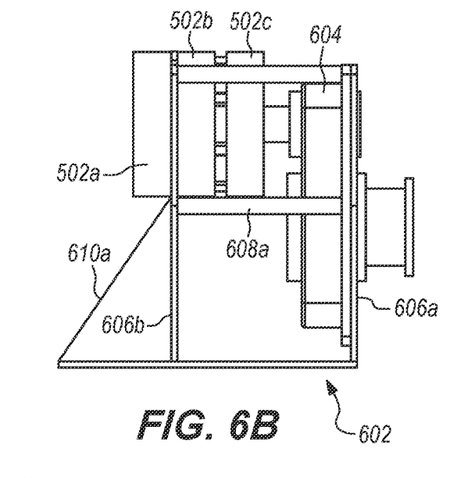
Figure 6C:
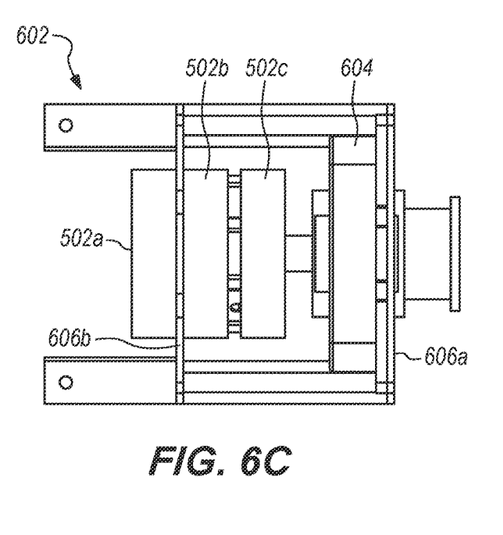

Referring now to FIGS. 6A-6C, various views of an assembly 602 configured to at least partially power at least one discharge pump that may be associated with at least one blending apparatus 100 that comprises at least one energy source 102 (apparatus 100 and energy source 102 not shown; see also FIGS. 1-2), according to an aspect of the present disclosure, are shown.

In some nonlimiting exemplary embodiments, blending apparatus 100 may comprise at least one discharge motor 120 in the form of at least one assembly 602. In some aspects, assembly 602 may comprise at least three motors 502 (labeled as motors 502a-c in FIGS. 6A-6C), each in the form of at least one traction motor, at least one AC induction motor, at least one permanent magnet AC (PMAC) motor, and/or at least one of any other type of motor, each paired with, mated to, or otherwise directly or indirectly associated with (e.g., coupled via one or more sections of electrically conductive wiring) at least one additional motor 502 configured as an AC and/or DC generator which may, in some aspects, be mounted, by way of example and not limitation, upon at least one portion of turbine generator 122 (not shown in FIGS. 6A-6C), and at least one gearbox 604. By way of further example and not limitation, the three (or more or fewer) motors 502 of assembly 602 that are not configured as generators may be stacked and synchronized in order to provide up to approximately 600 horsepower to at least one discharge pump that may be associated with a discharge end of manifold apparatus 116 (not shown in FIGS. 6A-6C). Gearbox 604 may be configured to reduce the speed established at the discharge pump(s) by motors 502. By way of still further example and not limitation, the speed may be reduced from approximately 7,500 revolutions per minute (RPM) to approximately 1,400 RPM at 2,400 ft-lbs. of torque. By way of yet further example and not limitation, in some additional aspects, the output of assembly 602 may enable the discharge pump(s) to push approximately 120 barrels oil per minute (bbl/min) out of blending apparatus 100.

In some aspects, assembly 602 may comprise at least one substantially planar and substantially vertical frame element 606 (shown as frame elements 606a-b in FIGS. 6A-6C) and at least one elongated support member 608 (labeled only as elongated support member 608a in FIGS. 6A-6C, for clarity). Additionally, in some nonlimiting exemplary embodiments, assembly 602 may further comprise at least one support brace 610 (shown as support brace 610a in FIGS. 6A-6C). As will be appreciated by those skilled in the relevant art(s) after reading the description herein, other structural configurations of assembly 602 may be used as well.

Figure 7:
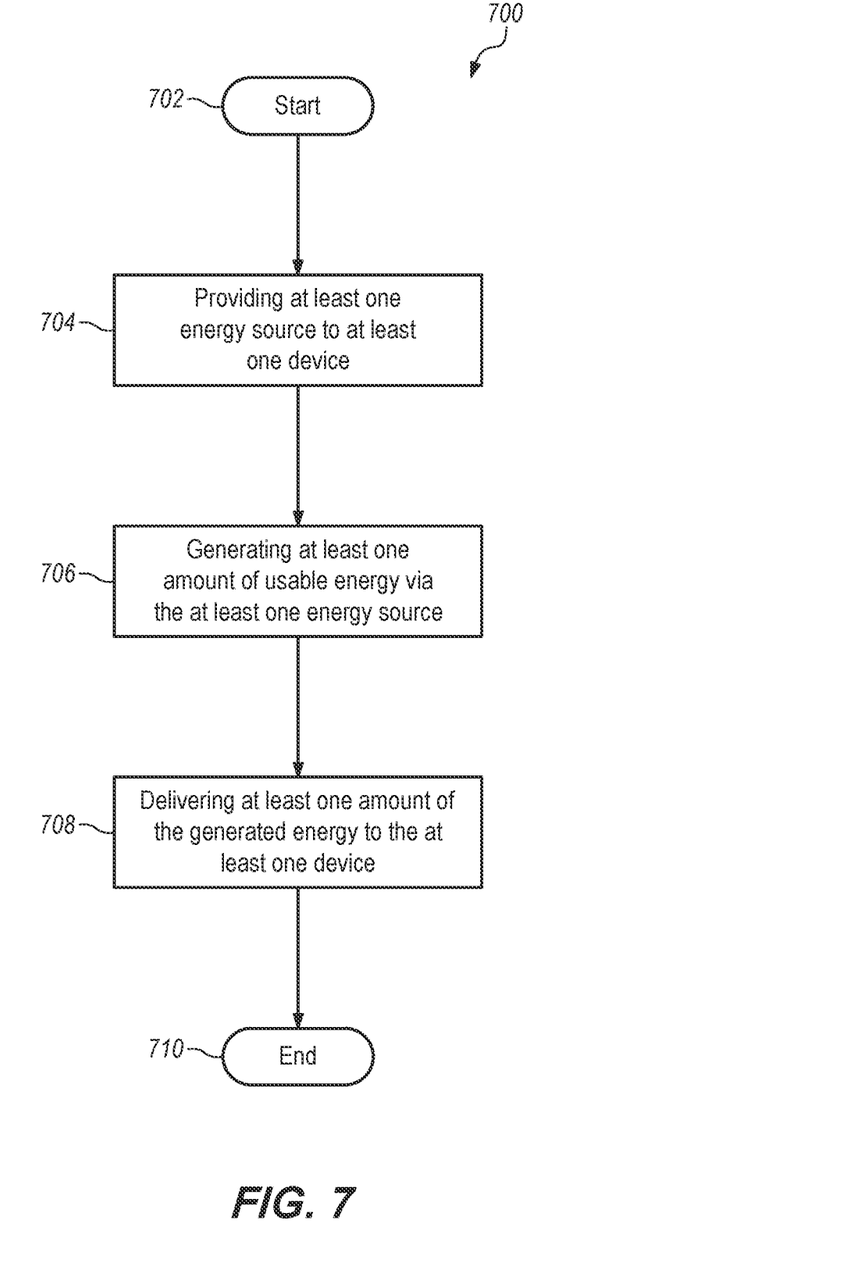
FIG. 7 is a flowchart illustrating an exemplary process for supplying at least one amount of energy to at least one device from at least one blending apparatus comprising at least one energy source, according to an aspect of the present disclosure.

Referring now to FIG. 7, a flowchart illustrating an exemplary process 700 for supplying at least one amount of energy to at least one device from at least one blending apparatus 100 comprising at least one energy source 102, according to an aspect of the present disclosure, is shown.

Process 700, which may at least partially utilize at least one blending apparatus 100 (not shown in FIG. 7), begins at step 702 with control passing immediately to step 704.

At step 704, at least one blending apparatus 100 provides at least one energy source 102 (not shown in FIG. 7) to at least one device (including, in some aspects, to blending apparatus 100 itself and/or at least one portion or component thereof). The at least one device may comprise any device that may be connected to and that may be configured to use at least one portion of the energy generated and/or provided by energy source(s) 102. In some aspects wherein blending apparatus 100 may be utilized in one or more drilling applications at a well site, the at least one device may comprise any machine, device, system, or element (including "backside equipment") used at the well site, such as, by way of example and not limitation, at least one hydration unit, at least one chemical additive unit, at least one gel tanker, at least one acid tanker, at least one piece of sand equipment, and at least one piece of water equipment, as well as any similar machines, devices, systems, or elements as may be apparent to those skilled in the relevant art(s) after reading the description herein. In order to provide energy to one or more of these devices, the device(s) may be connected to energy source(s) 102 via any appropriate means, including, by way of example and not limitation, via wiring, cables, and/or any similar means as may be apparent to those skilled in the relevant art(s) after reading the description herein, as well as any combination thereof.

At step 706, energy source(s) 102 associated with blending apparatus 100 generates at least one amount of usable energy. Although those skilled in the relevant art(s) will appreciate, after reading the description herein, that any appropriate energy source 102 may be used, in some nonlimiting exemplary embodiments, energy source(s) 102 may comprise, by way of example and not limitation, one or more turbine generators, SRMs, windmills, solar panels, batteries, and/or other appropriate power generation equipment as may be apparent to those skilled in the relevant art(s) after reading the description herein that may be configured to receive, capture, and/or utilize at least one type of energy or fuel and convert it to a useable form of energy (such as, by way of example and not limitation, electricity). Types of energy or fuel that may be received and/or captured by energy source(s) 102 may include, by way of further example and not limitation, natural gas (including compressed natural gas), diesel fuel, condensate, gasoline, sunlight, electricity, wind, and/or any other appropriate types of energy or fuel as may be apparent to those skilled in the relevant art(s) after reading the description herein, as well as any combination thereof. In some nonlimiting exemplary embodiments wherein the fuel may comprise natural gas, the natural gas may be delivered from a remote location or may be drilled for and received at the site at which blending apparatus 100 is being used. In some aspects, any of the various types of energy or fuel that may be received and/or captured by energy source(s) 102 may be stored within at least one portion of blending apparatus 100 (e.g., natural gas may be stored in an appropriate container).

At step 708, energy source(s) 102 associated with blending apparatus 100 delivers at least one amount of the generated usable energy to at least one device. In some aspects, the at least one device may comprise blending apparatus 100 or one or more portions and/or components thereof. In some additional aspects, the at least one device may comprise one or more devices in addition to or in lieu of blending apparatus 100. The energy may be delivered via any appropriate means as may be apparent to those skilled in the relevant art(s) after reading the description herein, including, by way of example and not limitation, via one or more wires, cables, and the like, as well as any combination thereof.

In some nonlimiting exemplary embodiments, the delivered energy may be utilized by one or more electric motors associated with blending apparatus 100, including one or more electric blender motors associated with blending tub(s) 108 (not shown in FIG. 7), electric auger motor(s) 110 (not shown in FIG. 7), one or more inlet suction motors 118 (not shown in FIG. 7), and/or one or more outlet discharge motor(s) 120 (not shown in FIG. 7), when relevant. Other devices that may utilize at least one portion of the energy generated by energy source(s) 102 may include, by way of example and not limitation, at least one element of the "backside equipment" associated with at least one well site operation, such as one or more hydration units, chemical additive units, gel tankers, acid tankers, pieces of sand equipment, pieces of water equipment, and the like, as well as any similar element(s), machine(s), system(s), and/or device(s) as may be apparent to those skilled in the relevant art(s) after reading the description herein, as well as any combination thereof.

At step 710 process 700 is terminated and process 700 ends.

Figure 8:
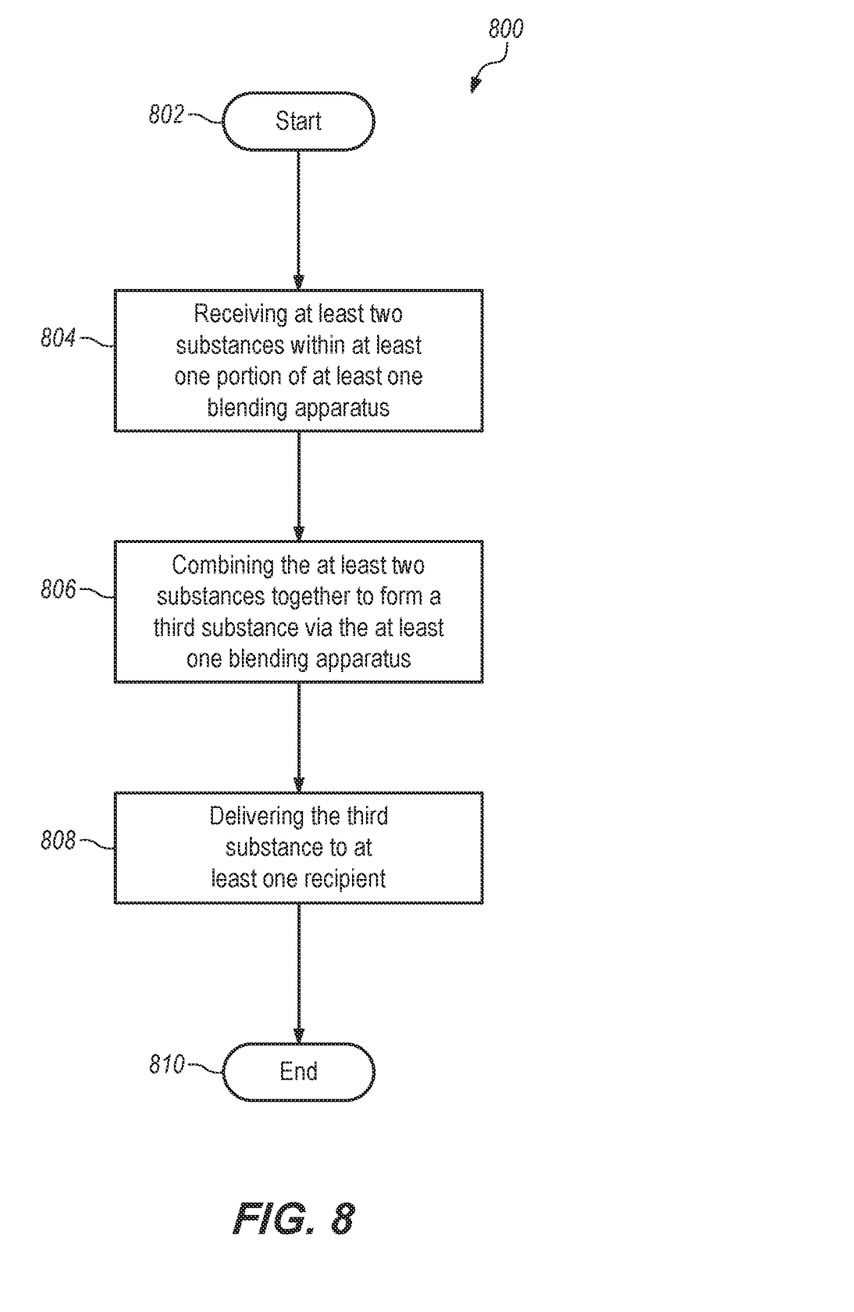
FIG. 8 is a flowchart illustrating an exemplary process for combining at least two substances together to form a third substance using at least one blending apparatus comprising at least one energy source, according to an aspect of the present disclosure.

Referring now to FIG. 8, a flowchart illustrating an exemplary process 800 for combining at least two substances together to form a third substance using at least one blending apparatus 100 comprising at least one energy source 102, according to an aspect of the present disclosure, is shown.

Process 800, which may at least partially utilize at least one blending apparatus 100 (not shown in FIG. 8), begins at step 802 with control passing immediately to step 804.

At step 804, at least one portion of at least one blending apparatus 100 receives at least two substances via various pumping mechanisms, manifolds, pipes, electric motors, and/or similar devices, mechanisms, systems, or structures. By way of example and not limitation, in some aspects, the substances may be received within at least one portion of at least one blending tub 108 (not shown in FIG. 8) through an inlet suction portion of at least one manifold apparatus 116 (not shown in FIG. 8) via the functioning of at least one inlet suction motor 118 (not shown in FIG. 8) associated with blending apparatus 100.

Depending on the nature of the substances received, they may be delivered from a variety of sources via a variety of means. For instance, in some nonlimiting exemplary embodiments, at least one of the substances may comprise at least one additive (e.g., proppant, chemicals, acids, sodium chloride, polyacrylamide, ethylene glycol, borate salts, sodium carbonates, potassium carbonates, glutaraldehyde, guar gum, citric acid, isopropanol, friction reducers, disinfectants, gelling agents, breakers, emulsifiers, stabilizers, surfactants, potassium chloride (KCl), iron control chemicals, oxygen scavengers, scale inhibitors, pH adjusting agents, carboxymethyl hydroxypropyl guar (CMHPG) gels, corrosion inhibitors, biocides, cement, and the like) that may be delivered from at least one additive source, such as, for example and not limitation, at least one hopper 114 (not shown in FIG. 8) via any appropriate means, such as, for example and not limitation, via at least one auger 112 (not shown in FIG. 8) powered by at least one electric auger motor 110 (not shown in FIG. 8). Other additive sources and delivery means may be used as well as may be apparent to those skilled in the relevant art(s) after reading the description herein.

In some additional nonlimiting exemplary embodiments, at least one of the substances received by blending apparatus 100 may comprise at least one fluid from at least one fluid source, wherein the fluid(s) may include, by way of example and not limitation, water, oil, methanol, slickwater, gasoline, one or more petroleum products, one or more chemicals, one or more gels, one or more crosslinkers, saltwater, brine, one or more acids, produced water, dirty water, liquefied natural gas (LNG), biofuel (or one or more products thereof), pipeline quality natural gas (or any quality natural gas), propane, diesel fuel, fuel oil, and/or the like, as well as any similar fluid(s) as may be apparent to those skilled in the relevant art(s) after reading the description herein, including any combination thereof. The fluid(s) may be pumped from at least one fluid source into blending tub(s) 108 (such as, for example and not limitation, a centrifugal blending tub) via any appropriate means, such as, for example and not limitation, through an inlet suction portion of manifold apparatus 116 via one or more inlet suction motors 118. Other fluid delivery means may be used as well as may be apparent to those skilled in the relevant art(s) after reading the description herein.

At step 806, blending apparatus 100 combines the at least two received substances together to form a third substance. The substances may be combined via the functioning of blending apparatus 100, such as, by way of example and not limitation, one or more paddles or similar mechanisms within blending tub(s) 108, which may be at least partially powered by one or more electric blender motors driven by electricity generated by energy source(s) 102. In some aspects, the substances may be treated by at least one hydration unit before being combined/mixed/blended within blending apparatus 100.

At step 808, blending apparatus 100 delivers the third substance to at least one recipient. In some aspects, the at least one recipient may comprise a system, device, area, and/or location. The third substance may be delivered via any appropriate means, such as via one or more pipes, tubes, pumping mechanisms, and/or manifolds, as well as any similar means as may be apparent to those skilled in the relevant art(s) after reading the description herein, as well any combination thereof. In order to facilitate such delivery, one or more electric motors may be used. By way of example and not limitation, in some aspects wherein blending apparatus 100 may be utilized in one or more drilling applications at a well site, the third substance may take the form of slurry/fracturing fluid and may be taken out of blending tub(s) 108 and through an outlet discharge portion of manifold apparatus 116 via at least one outlet discharge motor 120 (not shown in FIG. 8).

The at least one recipient to which the third substance is delivered may comprise an intermediary system, area, device and/or location that holds and/or handles the third substance temporarily, or a destination system, area, device and/or location wherein the third substance is ultimately used, stored, or otherwise received. Exemplary intermediary systems, areas, devices and/or locations include, without limitation, pressure pumps, other pumping mechanisms, various holding and/or mixing tanks, and the like. Exemplary destination systems, areas, devices and/or locations include, without limitation, an interior portion of a wellbore, various holding tanks, a decomposition, recycling, and/or waste facility, and the like.

At step 810 process 800 is terminated and process 800 ends.

Figure 9:
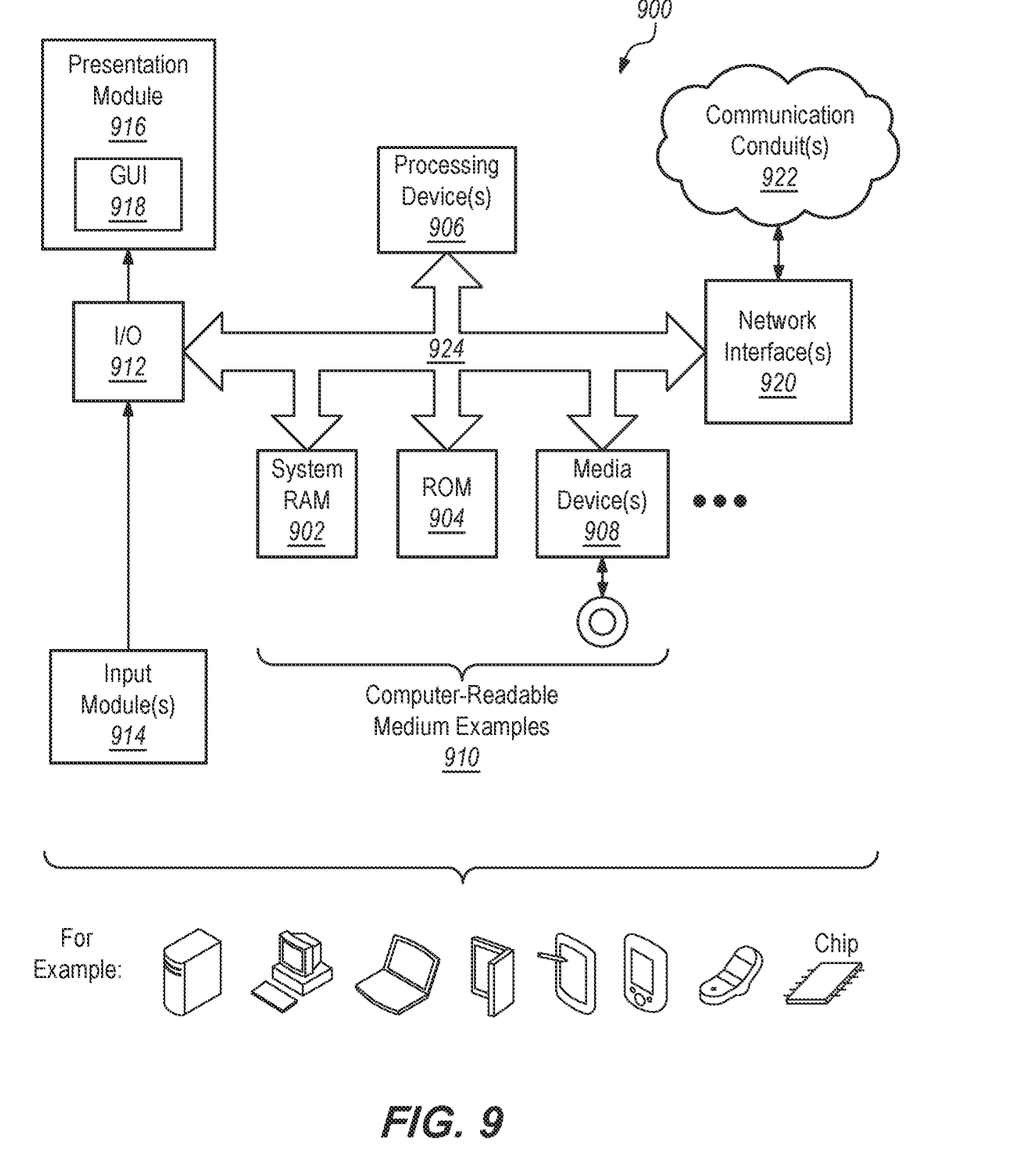
FIG. 9 is a block diagram of an exemplary computing system useful for implementing one or more aspects of the present disclosure.

Referring now to FIG. 9, a block diagram of an exemplary computing system 900 useful for implementing one or more aspects of the present disclosure is shown. FIG. 9 sets forth illustrative computing functionality 900, which in all cases, represents one or more physical and tangible processing mechanisms.

Computing functionality 900 may comprise volatile and non-volatile memory, such as RAM 902 and ROM 904, as well as one or more processing devices 906 (e.g., one or more central processing units (CPUs), one or more graphical processing units (GPUs), and the like). Computing functionality 900 also optionally comprises various media devices 908, such as a hard disk module, an optical disk module, and so forth. Computing functionality 900 may perform various operations identified when the processing device(s) 906 execute(s) instructions that are maintained by memory (e.g., RAM 902, ROM 904, and the like).

More generally, instructions and other information may be stored on any computer readable medium 910, including, but not limited to, static memory storage devices, magnetic storage devices, and optical storage devices. The term "computer readable medium" also encompasses plural storage devices. In all cases, computer readable medium 910 represents some form of physical and tangible entity. By way of example and not limitation, computer readable medium 910 may comprise "computer storage media" and "communications media."

"Computer storage media" comprises volatile and non-volatile, removable and non-removable media implemented in any method or technology for storage of information, such as computer readable instructions, data structures, program modules, or other data. Computer storage media may be, for example, and not limitation, RAM 902, ROM 904, EEPROM, Flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically comprise computer-readable instructions, data structures, program modules, or other data in a modulated data signal, such as carrier wave or other transport mechanism. Communication media may also comprise any information delivery media. The term "modulated data signal" means a signal that has one or more of its characteristics set or changed in such a manner as to encode information in the signal. By way of example, and not limitation, communication media comprises wired media such as wired network or direct-wired connection, and wireless media such as acoustic, RF, infrared, and other wireless media. Combinations of any of the above are also included within the scope of computer readable medium.

Computing functionality 900 may also comprise an input/output module 912 for receiving various inputs (via input modules 914), and for providing various outputs (via one or more output modules). One particular output module mechanism may be a presentation module 916 and an associated GUI 918. Computing functionality 900 may also include one or more network interfaces 920 for exchanging data with other devices via one or more communication conduits 922. In some aspects, one or more communication buses 924 communicatively couple the above-described components together.

Communication conduit(s) 922 may be implemented in any manner (e.g., by a local area network, a wide area network (e.g., the Internet), and the like, or any combination thereof). Communication conduit(s) 922 may include any combination of hardwired links, wireless links, routers, gateway functionality, name servers, and the like, governed by any protocol or combination of protocols.

Alternatively, or in addition, any of the functions described herein may be performed, at least in part, by one or more hardware logic components. For example, without limitation, illustrative types of hardware logic components that may be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

The terms "module" and "component" as used herein generally represent software, firmware, hardware, or any combination thereof. In the case of a software implementation, the module or component represents program code that performs specified tasks when executed on one or more processors. The program code may be stored in one or more computer readable memory devices, as described with reference to FIG. 9. The features of the present disclosure described herein are platform-independent, meaning the techniques can be implemented on a variety of commercial computing platforms having a variety of processors (e.g., desktop, laptop, notebook, tablet computer, personal digital assistant (PDA), mobile telephone, smart telephone, gaming console, and the like).

It is noted that the order of the steps of processes 700 and 800, including the starting points thereof, may be altered without departing from the scope of the present disclosure, as will be appreciated by those skilled in the relevant art(s) after reading the description herein.

While various aspects of the present disclosure have been described above, it should be understood that they have been presented by way of example and not limitation. It will be apparent to persons skilled in the relevant art(s) that various changes in form and detail can be made therein without departing from the spirit and scope of the present disclosure. Thus, the present disclosure should not be limited by any of the above described exemplary aspects, but should be defined only in accordance with the following claims and their equivalents.

In addition, it should be understood that the figures in the attachments, which highlight the structure, methodology, functionality and advantages of the present disclosure, are presented for example purposes only. The present disclosure is sufficiently flexible and configurable, such that it may be implemented in ways other than that shown in the accompanying figures (e.g., utilization with different energy sources; utilization of different system elements; implementation with computing devices, environments, and methods other than those mentioned herein). As will be appreciated by those skilled in the relevant art(s) after reading the description herein, certain features from different aspects of the apparatuses, methods, and computer program products of the present disclosure may be combined to form yet new aspects of the present disclosure.

Further, the purpose of the foregoing Abstract is to enable the U.S. Patent and Trademark Office and the public generally and especially the scientists, engineers and practitioners in the relevant art(s) who are not familiar with patent or legal terms or phraseology, to determine quickly from a cursory inspection the nature and essence of this technical disclosure. The Abstract is not intended to be limiting as to the scope of the present disclosure in any way.

What is claimed is:

1. An apparatus, comprising:
   at least one energy source having an output shaft;
   a first plurality of motors mounted to the output shaft to generate electricity;
   a second plurality of motors that are stacked and synchronized to consume the electricity from the first plurality of motors to generate torque, wherein an electrical output from the first plurality of motors is connected to an electrical input to the second plurality of motors by at least one electrically conductive wire; and
   a discharge pump mechanically coupled to the second plurality of motors, wherein the torque generated by the second plurality of motors causes the discharge pump to discharge a slurry from a blending tub.

2. The apparatus of claim 1, wherein, for each of the first plurality of motors, the motor has an electrical output that is coupled to an electrical input of one of the second plurality of motors via electrically conductive wiring.

3. The apparatus of claim 1, further comprising:
   a gearbox mechanically coupled between the second plurality of motors and the discharge pump to reduce a speed of the discharge pump relative to a speed of the second plurality of motors.

4. The apparatus of claim 1, wherein the at least one energy source includes a turbine generator.

5. The apparatus of claim 4, wherein the turbine generator is powered by natural gas, diesel fuel, and/or natural gas condensate.

6. The apparatus of claim 1, wherein each of the first plurality of motors are configured as direct current generators.

7. The apparatus of claim 1, wherein each of the first plurality of motors are configured as alternating current generators.

8. The apparatus of claim 1, wherein the first plurality of motors includes four motors.

9. The apparatus of claim 8, wherein each of the first plurality of motors produces up to 700 volts of direct current potential.

10. The apparatus of claim 1, wherein the second plurality of motors includes four motors.

11. The apparatus of claim 10, wherein each of the second plurality of motors is configured to produce about 200 horsepower.

12. The apparatus of claim 10, wherein each of the second plurality of motors is configured to produce about 295 foot pound of torque.

13. The apparatus of claim 1, wherein the at least one energy source further includes a switched reluctance motor, a windmill, a solar panel, and/or a battery.

14. The apparatus of claim 1, further comprising:
   a control station for controlling the operation of the discharge pump, wherein the control station includes at least one computer coupled for receiving power from the at least one energy source.

15. The apparatus of claim 1, further comprising:
   at least one additional device selected from an inlet suction motor coupled to a pump for delivering fluid to the blending tub, an auger motor coupled to an auger for delivering an additive to the blending tub, and/or a blender motor for turning paddles within the blending tub.

* * * * *